Dec. 28, 1943.     C. W. MOTT     2,337,762
POWER DEVICE FOR IMPLEMENTS
Filed July 12, 1940     3 Sheets-Sheet 1

Inventor
C.W. Mott
By Paul O. Pippel
Atty.

Dec. 28, 1943.  C. W. MOTT  2,337,762
POWER DEVICE FOR IMPLEMENTS
Filed July 12, 1940  3 Sheets-Sheet 2

Inventor
C. W. Mott
By Paul O. Rippel
Atty.

Dec. 28, 1943.  C. W. MOTT  2,337,762
POWER DEVICE FOR IMPLEMENTS
Filed July 12, 1940  3 Sheets-Sheet 3
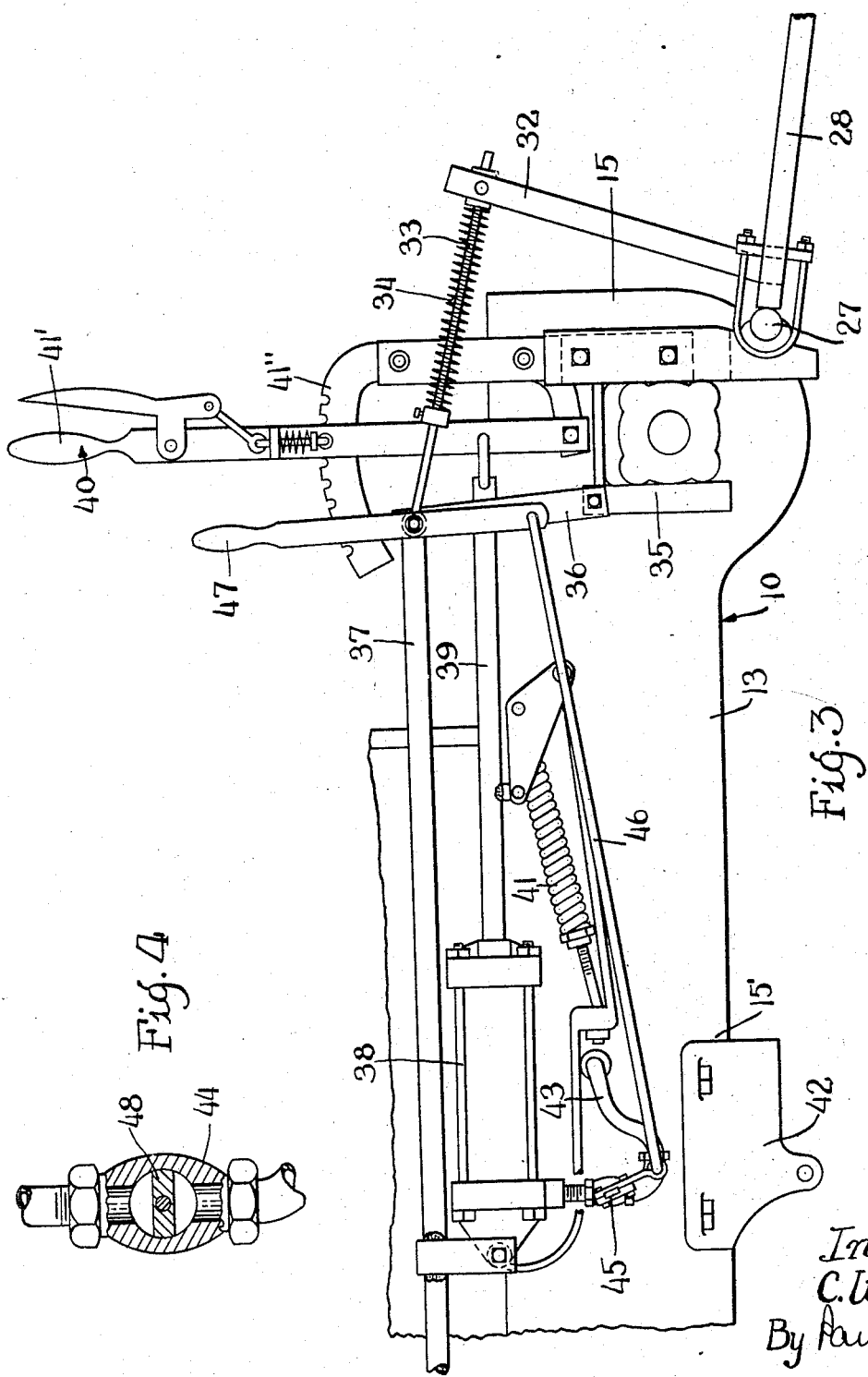

Patented Dec. 28, 1943

2,337,762

UNITED STATES PATENT OFFICE 2,337,762

POWER DEVICE FOR IMPLEMENTS

Carl W. Mott, La Grange, Ill., assignor to International Harvester Company, a corporation of New Jersey Application July 12, 1940, Serial No. 345,145

10 Claims. (Cl. 97—50)

This invention relates to power devices for implements adapted to be moved from one position to another with respect to a main carrying frame, such as a tractor on which the implements may be directly mounted for movement to and from their ground-working positions.

It is an object of this invention to provide an arrangement of such power device wherein individual control of implements at one location with respect to the implement-carrying frame may be had independently of the control of implements located at another location on the implement-carrying frame and wherein a single control to operate the implements jointly is provided when it is not desired that they be operated individually.

It is another object of the invention to provide in a power device for implements mounted on an implement-carrying frame a main control mechanism utilized for effecting power adjustment of the implements to regulate their working depth, and an individual control means associated with each of the implements wherein any individual rig may be retained in its adjusted position without effecting the adjustment or operation of the other unit by the main control mechanism.

It is another object of the invention to provide an implement-carrying frame with the implements thereon arranged so that operation of the implements at one side of the tractor may be had independently of the operation of the implements at the other side of the tractor, whereby the entire arrangement lends itself particularly for cultivating in a field wherein the rows come into the end of the field at a point so that the cultivating rigs at one side of the tractor which arrive sooner than those at the other side of the tractor may be lifted prior to lifting the cultivating rigs at the other side of the tractor.

In carrying out the present invention, use is made of a control mechanism, such as shown in the pending application of Alexus C. Lindgren and Carl W. Mott, Serial No. 181,778, filed December 27, 1937, and that shown in the pending application of Carl W. Mott, Serial No. 326,059, filed March 26, 1940. With this mechanism, it is possible to limit the fluid to individual power-actuating means located respectively at the sides of the tractor for the purpose of driving fluid to the same simultaneously to effect lifting of the cultivating implements in unison. This control mechanism is of such design that the cultivating rigs may even be adjusted by this means as by releasing the control element prior to the complete lifting of the rigs. With this mechanism available, means has been provided wherein the individual hydraulic actuating means located at the respective sides of the tractor may be individually and selectively controlled. Separate valves have been associated with each of the hydraulic cylinders and means has been provided near to the operator's station for the regulation of these separate control valves. By the use of these individual control valves, the fluid actuating devices may be locked to thereby hold the cultivating rigs at either side of the tractor in either their raised, lowered, or adjusted position without interfering with the operation of the fluid-actuating device on the opposite side of the tractor. Also, since each side of the tractor has in effect a separate lifting mechanism which can be separately controlled, the entire arrangement lends itself particularly adaptable to the cultivation of row crops which run into the end of the field to form a point. In such instances the rigs at one side of the tractor are lifted first and then the rigs at the other side of the tractor, laterally spaced from the rigs on the one side, may be lifted by unlocking the actuating device at the opposite side of the tractor upon the rigs on the latter side of the tractor having arrived at the end of the row at a later time.

For other objects and for a better understanding of the invention, reference may be had to the following detailed description taken in connection with the accompanying drawings, in which:

Figure 3 is an enlarged portion of a part of the showing of Figure 1 to bring out more clearly the vital parts of the present invention; and, Figure 4 is a detail view in section of the individual valve control means associated with each of the actuating devices.

Figure 1:
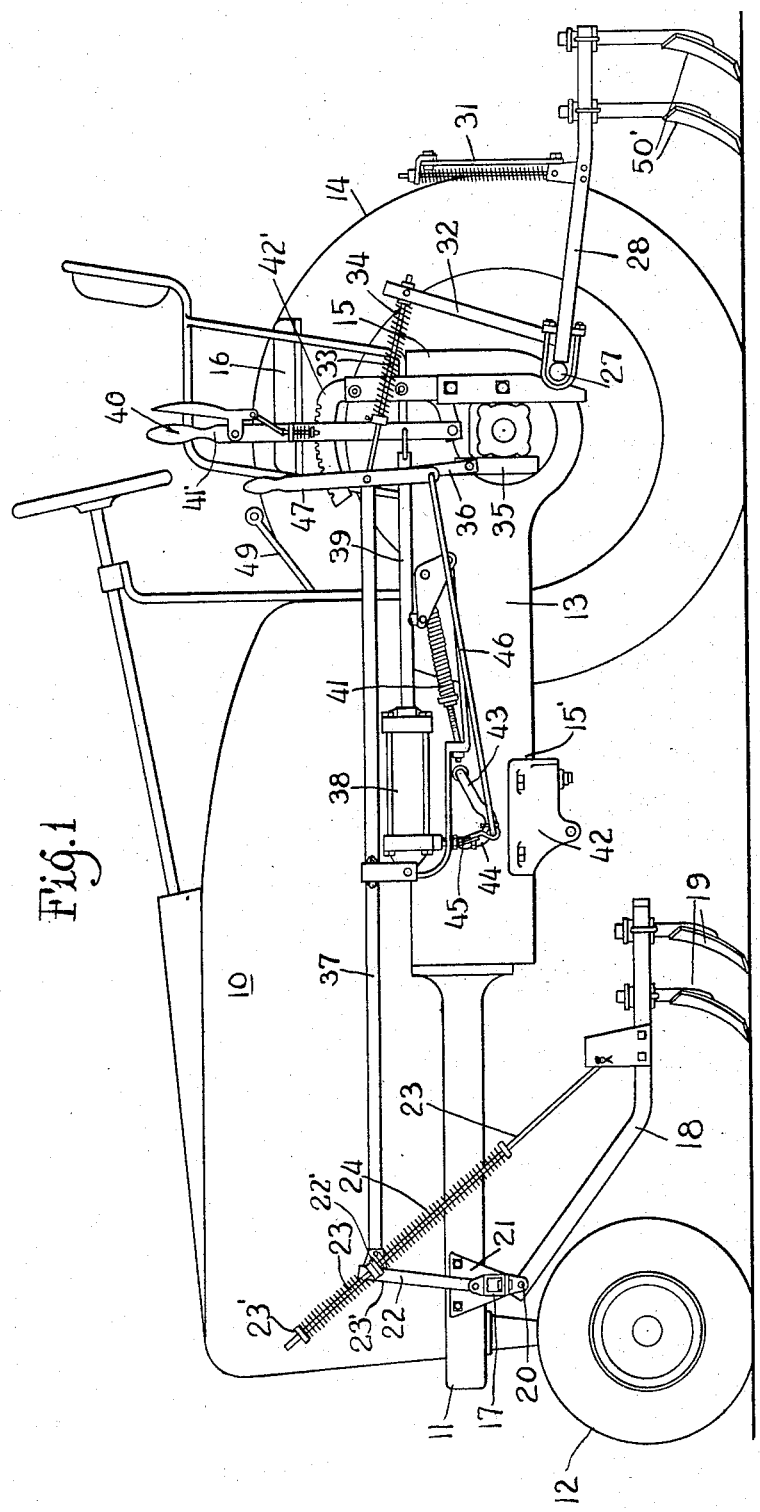
Figure 1 is a view in side elevation of a tractor with the implements and power-adjusting devices of the present invention connected thereto.

Referring now to the figures, there is shown generally a general purpose tractor 10 having a forward portion 11 supported by forward and steerable wheels 12 and a rearward portion 13 supported by rear drive wheels 14 adapted to be driven in the usual manner by mechanism within the differential and rear axle housing 15. Located on the rear portion 13 of the tractor is an operator's station 16 from which control of the tractor and of the various devices to be hereinafter described may be effected.

Figure 2:
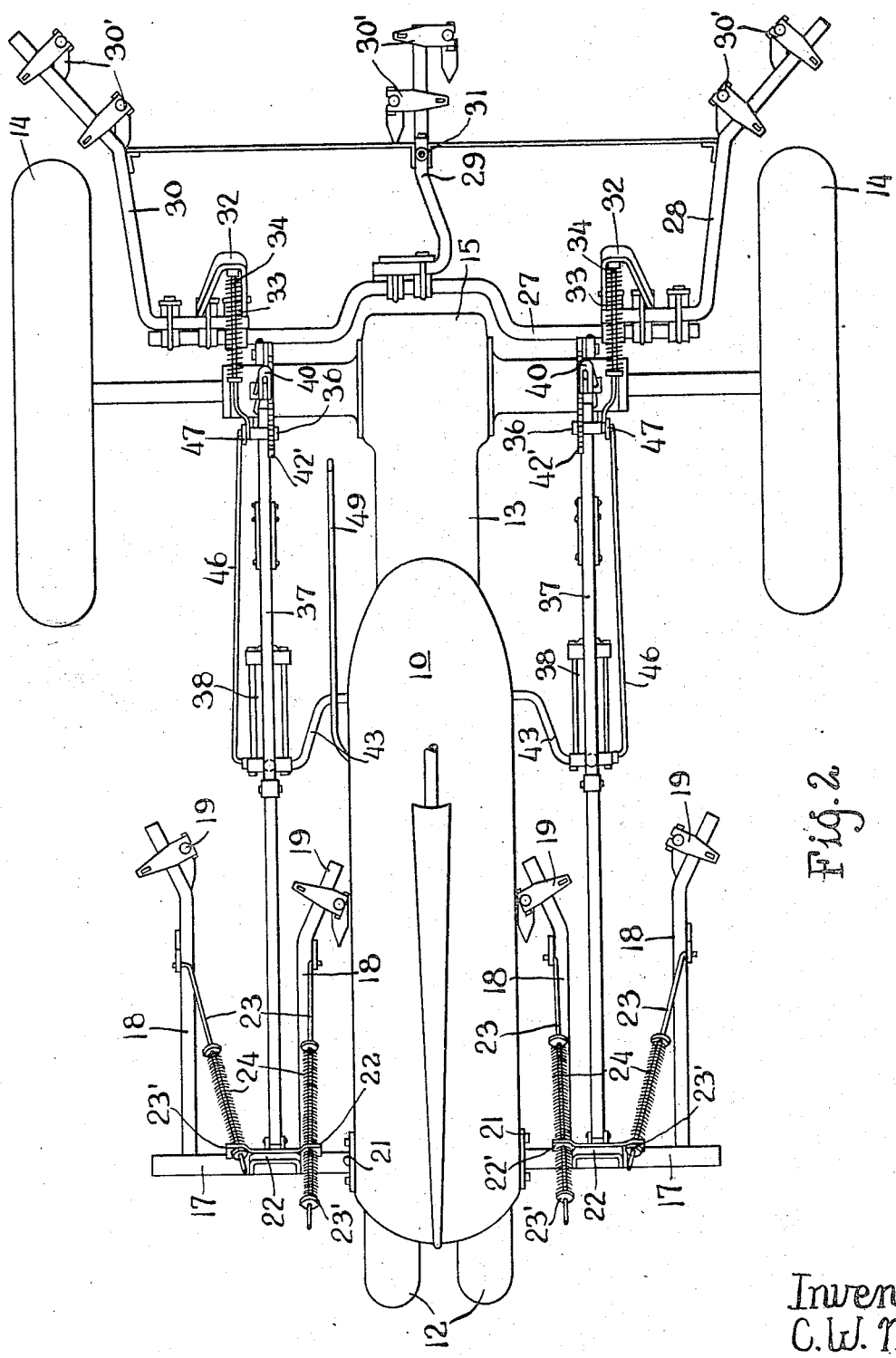
Figure 2 is a plan view of the tractor illustrating particularly the location of the implements and the individual actuating devices at opposite sides of the tractor.

On the front portion 11 of the tractor there is connected a transverse tool-carrying means 17 to which is pivotally connected the forward cultivating rigs 18 having the working tools 19. Each rig 18 is pivoted at 20 to a depending bracket 21 carried by the transverse rig-supporting means 17. There is a pair of these rigs 18 located at and adapted to extend along each side of the tractor (see Figure 2). On the rig-supporting means 17 and preferably connected to the bracket 21 is mounted a fore and aft movable lifting lever 22. From this lifting lever 22 there may be connected to the rigs 18 individual lift rods 23 adapted to be slidable through transversely extending plate portions 22' movable with the lifting lever 22. On each of these lift rods 23 is provided the usual pressure spring 24. As the lifting lever 22 moves in a forward direction, the plate portion 22' will engage stop means 23' on the lift rods to thereby effect positive lifting of the cultivating rigs or implements 18.

On the rear portion 13 of the tractor there is pivotally connected to a transversely extending supporting member 27, which is rigidly connected with the housing 15, a plurality of rear cultivating rigs 28, 29, and 30. These rear rigs have ground-working tools 30'. Each of the rigs 28 and 30 is located respectively at the sides of the tractor while the cultivating rig 29 is located centrally and intermediate the sides of the tractor. By means of a jockey arch mechanism 31 interconnecting the two side rigs 28 and 30, lifting of the centrally disposed rig 29 may be effected simultaneously with the lifting of the side rigs 28 and 30. Each of the side rigs 28 and 30 has rigidly connected thereto a vertically extending arm 32, to the upper end of which is connected the lifting rod 33 having a pressure spring 34. Pivotally mounted on the differential and rear axle housing 15 by means of a bracket 35 there is a rear fore and aft, movable lever 36, similar to the fore and aft movable lever 22 on the front portion of the tractor.

Both the levers 22 and 36 are interconnected by a longitudinally extending lift pipe 37, which, when moved in a forward direction, will effect simultaneously the lifting of the rigs on both the forward and rear portions of the tractor at the one side thereof. It should be understood that, while the description has been directed more or less to the mounting of the implement rigs on the tractor in general, it should be at least sufficient that the rigs on both the front and rear portions of the tractor at their respective sides are operated, if desired, independently of the rigs on the front and rear portions of the tractor at the opposite side thereof, this being apparent by the showing of two lifting pipes 37 on the respective sides of the tractor.

Connected to each of these lifting pipes 37 at a location substantially midway between the ends of the same is a fluid-actuating device 38 having a piston rod 39 connected at its rearward end to a manual adjusting mechanism 40. Each fluid device 38 may include a spring-holding mechanism 41 always tending to maintain a collapse of the cylinder and the piston within, and to apply master pressure to the implements when in their ground-working position. This spring mechanism is shown and described in the pending application, Serial No. 326,063, filed March 26, 1940, in the name of Carl W. Mott and James Morkoski, and forms no part of the present invention.

Associated with gearing within the housing 15 is a pump and control mechanism contained within a pump and control housing 42 adapted to be fastened to a forward end 15' of the housing 15 in the manner shown in the pending application, Serial No. 326,059, above referred to. From this housing 42 and through the portion 15' of the gear housing 15 there extends at each side of the tractor a hose connection 43 for the purpose of delivering fluid to the respective fluid devices 38. Each of these hose connections 43 is connected to a valve mechanism 44 carried by the fluid devices 38. Each of these valve mechanisms 44 includes an operating arm 45 to which may be connected a rearwardly extending and operating link 46 which extends rearwardly for connection to the lower end of an operating lever 47 located near to the operator's station 16. With the lever 47 and the arm 45 in the positions shown in Figures 1 and 3, the valve mechanism 44 may be closed so that a valve element 48 within the valve mechanism 44 may take the position shown in Figure 4. Upon movement of the upper end of the lever 47 forwardly, the valve mechanism 44 may be operated and the arm 45 will turn the element 48, so that fluid may then pass through the valve mechanism 44.

As explained in the early above mentioned applications, the valve mechanism within the housing 42 may be operated by a fore and aft movable rod 49 adapted to extend to a location near to the operator's station 16. By forward movement of the rod 49 fluid will be delivered through the hose connections 43 to the fluid devices at the respective sides of the tractor, providing both of the selective valve mechanisms 44 are in their open position and assuming that the implements are in their ground-working positions. When the operator has closed one of the valve mechanisms 44 previously to the operation of the main control mechanism to effect lifting, so that said valve mechanism is in the position shown in Figures 1 and 3, the implements located on that side of the tractor will not be lifted along with the rigs on the other side of the tractor. Thus, it should be apparent that, if power adjusting of the implements is desired, this may be done by merely locking the rigs on the one side of the tractor against operation. It is often desired to have a difference of adjustment on one side relative to the other side, and it should be apparent that by the present invention this adjustment may be accomplished by power means. To do this the operator need only move the rod 49 forwardly for a slight interval of time, then return the same, whereby the rigs at the opposite side of the tractor will be adjusted. As described in the above mentioned application, there is provided a main trap valve which will retain the fluid in the cylinders 38. This fluid will be retained in the fluid-actuating devices 38 until the rod 49 is completely returned rearwardly, whereupon these trap valves will be opened to permit the fluid in the fluid-actuating devices to return to the reservoir housing 42.

While it has been explained that the rigs at one side may be retained in a ground-working position while the rigs at the other side may be power adjusted, it should also be apparent that, by closing the valve mechanism 44 after the rigs at one side have been raised, the rigs at that side may be maintained in the raised position, and that independent operation of the implements at the opposite side may be had. In other words, it should be seen that, by the use of the valve mechanism 44, the rigs at the respective sides of the tractor may be locked in their lowered, adjusted, or raised positions, or at any time to prevent the flow of fluid to or from the fluid-actuating devices 38.

The arrangement with these selecting valves also has particular advantage when cultivation is being made of point rows. By point rows it is meant rows that adjoin the end of the field at an angle other than 90 degrees. As the tractor arrives at the end of such a field, it is desired that the rigs at one side of the tractor be raised prior to the rigs at the opposite side of the tractor. It should be apparent that with the present mechanism the rigs on the side of the tractor may be retained in their locked positions by locating the lever 47 at a position shown in Figures 1 and 3, so that, when the main control mechanism is operated by means of forward movement of the rod 49, only the rigs at that side of the tractor where the valve mechanism 44 is open and the rigs nearest to the end of the row will at first be operated or lifted. When the rigs at the opposite side of the tractor, where the valve is closed, arrive at the end of the row, the lever 47 may be pivoted so that the upper end has been moved forwardly, thereby to operate the valve mechanism 44 so that fluid may then pass to the fluid devices 38, so that it will be extended to operate the implements on that side of the tractor.

While there has been shown a manual mechanism 40, it should be understood that the operator is not dependent upon this manual mechanism to obtain adjustment of the rigs or implements. This adjustment of the implements may be accomplished sufficiently by the control rod 49. The manual adjusting mechanism 40 is merely included to give additional adjustment, or wider range, than that obtained by the adjustment by power, and to have manual means of adjustment available to those operators who may desire the same in preference to power adjustment. The manual adjusting mechanism comprises a manually operated lever 41' pivoted on a quadrant 41" for locking engagement therewith, and, when the adjustment is made, the fluid device 38 will be bodily moved and will take with it the lift pipe 37 to effect pivoting of the lifting levers 22 and 36. To obtain a shallow operating depth, the adjusting lever 41' will be moved forwardly. The movement of this lever 41' forwardly would be assisted by the tendency of the cultivating shovels to want to leave the ground, thus making it unnecessary to have long levers. When a greater depth adjustment is desired, the manually operating lever 41' is pulled rearwardly.

While various changes may be made in the detail construction, it shall be understood that such changes shall be within the spirit and scope of the present invention as defined in the appended claims.

What is claimed is:

1. In combination, a tractor, a plurality of implements respectively connected to the tractor at different locations thereon and for movement with respect thereto, fluid-operable means for moving the implements including main control means for normally effecting adjusting movement of the implements, a fluid-actuating device connected to move each implement and connected to the tractor so that it will be capable of bodily movement, individual control means associated with each fluid device whereby the adjustment of the one implement may be retained while effecting adjustment of the other implement, and manual means associated with each fluid device to effect further adjusting movement of the respective implements by bodily moving the fluid device and independent of the fluid adjustment thereof.

2. In combination, a frame, an implement connected at each side of the frame for adjusting movement, fluid power-operable means for adjusting the implement with respect to said frame and including a separate fluid-actuating device for each implement mounted for bodily movement with respect to the frame and adapted to extend itself from an unextended position to an extended position, valve means for controlling the fluid to and from the respective actuating device whereby the implement may be locked in either of its positions, and manual means for effecting further adjusting movement of the implement by bodily adjustment of the actuating device.

3. In combination, a tractor having front and rear portions, ground-working implements respectively mounted on the front and rear portions at locations to run substantially coextensive with the sides of the tractor and for vertical movement to and from their ground-working positions, power-operable means deriving power from the tractor for moving the implements including power-actuating devices, one located at each side of the tractor and connected to respectively move the front and rear implement at the one side of the tractor, and individual control means for separately locking the implements at each side of the tractor in either of their respective positions.

4. In combination, a tractor having front and rear portions, ground-working implements respectively mounted on the front and rear portions at locations to run substantially coextensive with the sides of the tractor and for vertical movement to and from their ground-working positions, fluid power-operable means for moving the implements including fluid-actuating devices, one located at each side of the tractor and connected to respectively move the front and rear implement at the one side of the tractor, and individual manually operable valve control means associated with each of the fluid-actuating devices for separately locking the same to retain the implements at each side of the tractor in either of their respective positions.

5. In combination, a tractor having front and rear portions, ground-working implements respectively mounted on the front and rear portions at locations to run substantially coextensive with the sides of the tractor and for vertical movement to and from their ground-working positions, fluid-operable means for moving the implements including fluid-actuating devices, one located at each side of the tractor and connected to respectively move the front and rear implements at the one side of the tractor, and separate valve control means associated with each actuating device for locking the same to retain the implements at each side of the tractor in either of their respective positions.

6. In combination, a tractor, force-reaction means translatorily adjustable on the tractor, a plurality of implements respectively connected to the tractor at different locations thereon and for movement from one position to another position with respect to said translatory force-reaction means, fluid power operable means for moving the implements including an independent fluid-actuating device for each implement and associated with said force-reaction means for reacting thereagainst while being actuated to move such implement toward one of its positions, means for locking the respective implements in either of their respective positions, and means for effecting the translatory adjustment of said force-reaction means to change the positions of the implements with respect to the tractor.

7. In combination, a tractor, a plurality of force-reaction means translatorily adjustable independently of the tractor, a plurality of cultivating implements connected to the tractor at different locations thereon and respectively associated with said force-reaction means for movement from one position to another position with respect thereto, fluid power-operable means for moving the implements including a fluid-actuating device for each implement and respectively associated with said force-reaction means for reacting thereagainst while being actuated to move its implement toward one of its said positions, means associated with each of the fluid-actuating devices and settable for precluding action thereof, and means associated with said force-reaction means to selectively effect the translatory adjustment thereof to change the positions of such implements with respect to the tractor.

8. In combination, a tractor, a plurality of force-reaction means translatorily adjustable independently on the tractor, a plurality of ground-working implements respectively connected to the tractor at different locations thereon and for vertical movement to and from their ground-working positions, fluid power-operable means for moving the implements including a fluid-actuating device connected to each implement to move the same respectively to and from its ground-working position, when energized by subjection to a fluid pressure differential, said fluid-actuating devices being also respectively associated with said force-reaction means to react thereagainst when so energized, valve means associated with each actuating device for precluding the ingress and egress of actuating fluid with respect thereto for locking the respective implements to their force-reaction means while in either of their respective positions, and means associated with said force-reaction means to selectively effect the translatory adjustment thereof to alter the positions of the implements locked thereto as aforesaid.

9. In combination, a frame, force-reaction means translatorily adjustable on the frame, an implement connected to the frame for adjusting movement with respect thereto, fluid-operable means for adjusting the implement with respect to said frame and including a fluid cylinder device connected between said force-reaction means and the implement, main manual control means for causing flow of fluid to the fluid cylinder device to effect operation of the same, manually operable valve control means associated with the cylinder device for locking the same to retain the implement in its adjusted position relatively to the force-reaction means, and means for adjusting said force-reaction means to bodily move said cylinder device for adjusting the implement with respect to the frame.

10. In combination, a vehicle, a plurality of force-reaction means translatorily adjustable independently of the tractor, a plurality of implements connected to the vehicle for movement from one position to another position, a plurality of fluid power means respectively connected between said force-reaction means and the implements and reactable therebetween, when subjected to a fluid pressure differential, to normally cause movement of their associated implements, selector devices associated respectively with each of the implements for locking any one or more of the same to their force-reaction means to selectively hold such implements against movement from one position to another position whereby upon operation of the fluid power means only certain of said implements will be moved, and means for selectively adjusting said force-reaction means to move therewith their implements while locked as aforesaid.

CARL W. MOTT.